Sept. 10, 1935.  C. D. BUDELMAN  2,013,681
MULTIPLE SIGNATURE MACHINE
Filed May 22, 1933  4 Sheets-Sheet 2

Inventor:
Christopher D. Budelman
By Thos. A. Ramsey Jr. Atty.

Sept. 10, 1935.  C. D. BUDELMAN  2,013,681
MULTIPLE SIGNATURE MACHINE
Filed May 22, 1933  4 Sheets-Sheet 3
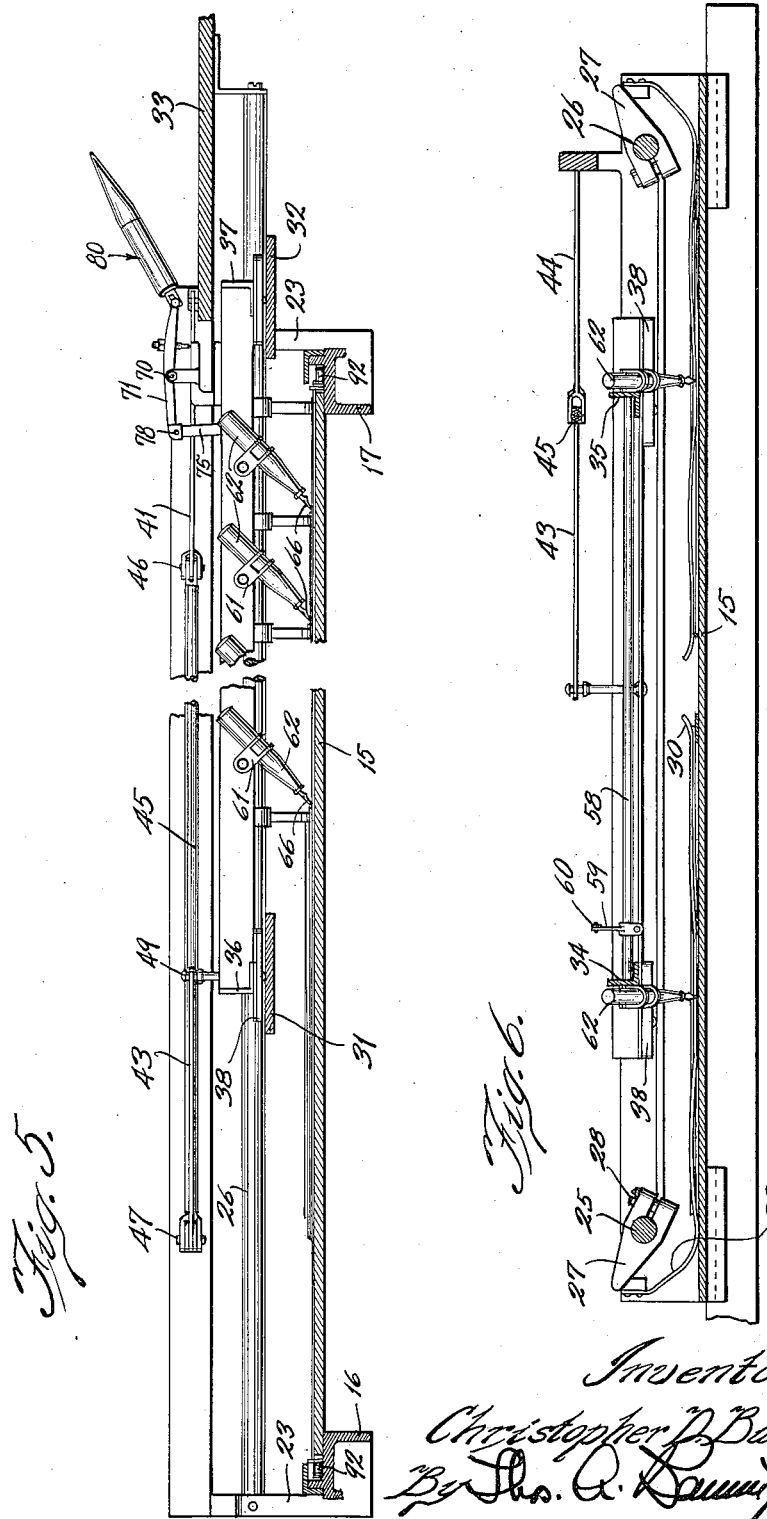

Sept. 10, 1935.  C. D. BUDELMAN  2,013,681
MULTIPLE SIGNATURE MACHINE
Filed May 22, 1933   4 Sheets-Sheet 4
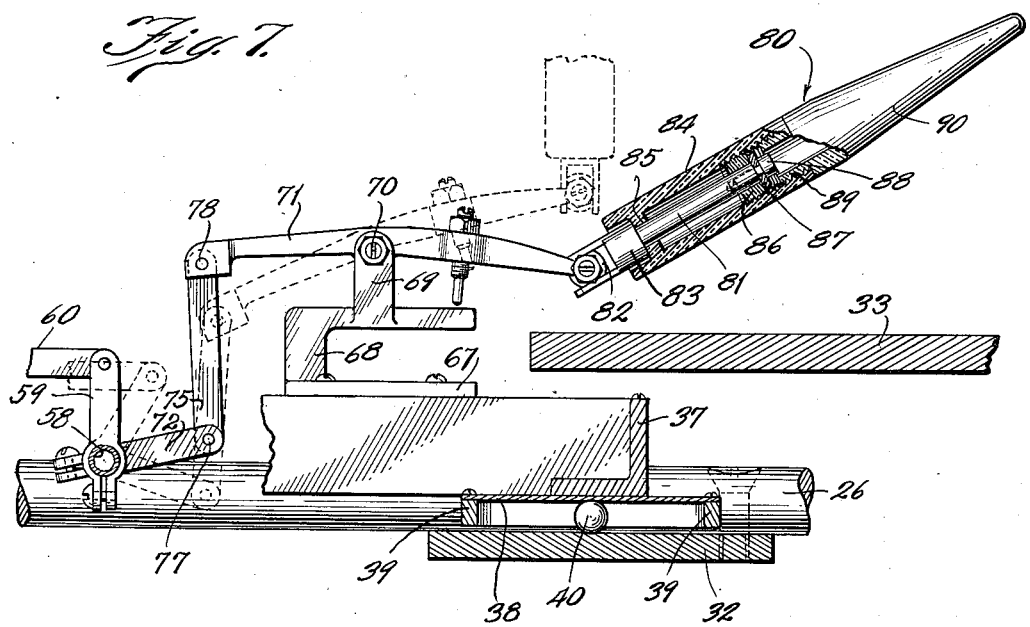
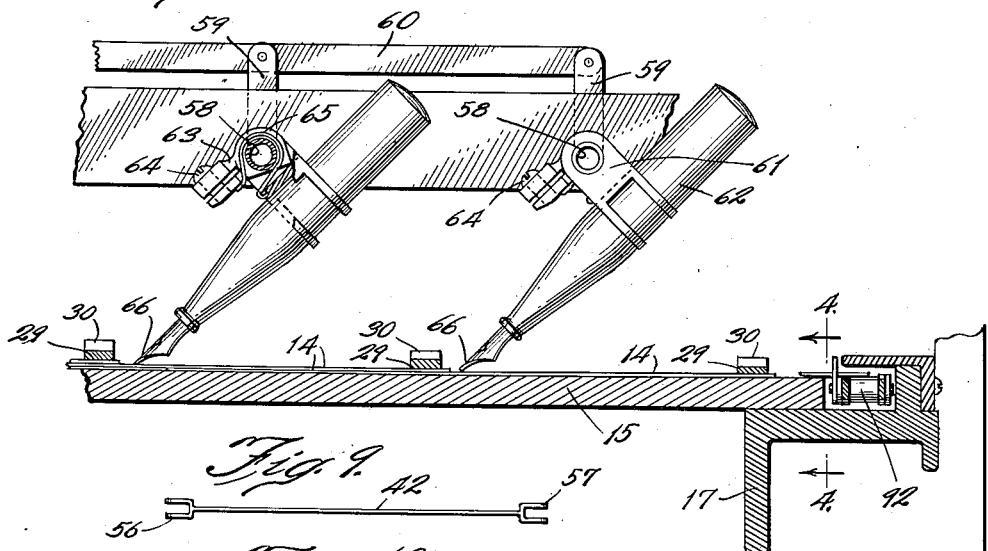
Inventor:
Christopher D. Budelman Patented Sept. 10, 1935

2,013,681

UNITED STATES PATENT OFFICE 2,013,681

MULTIPLE SIGNATURE MACHINE

Christopher D. Budelman, Chicago, Ill.

Application May 22, 1933, Serial No. 672,265

5 Claims. (Cl. 33—23)

The present invention has to do with improvements in multiple signature machines—that is, machines which are intended for simultaneously tracing a plurality of signatures as the operator traces the stylus with his hand to produce the signatures. Machines of this kind are used for signing various documents where it becomes necessary to trace many thousands of signatures; and these machines are used for saving time and effort on the part of the signer. For example such machines are used for signing bonds, interim receipts, and similar documents.

One object of the invention is to produce a machine which will very accurately and faithfully trace or reproduce the movements of the stylus at the position of each one of the multiple pen points so that all of the signatures will accurately and faithfully reproduce the original stylus movements.

Another feature of the invention relates to the provision of a machine of very light and simple construction in its moving parts so that the inertia or momentum of these moving parts is reduced to a minimum amount. This will correspondingly reduce the effort necessary on the part of the signer and will correspondingly reduce fatigue and increase the accuracy of the signing movements.

Another benefit derived from the reduction of inertia and momentum of the moving parts is that the tendency to over-run or over-throw when producing strokes with the stylus is reduced. Thus for example when moving the stylus up and down to produce such a letter as a "*t*" or a "*g*" there is a tendency for the moving parts to run too far up or too low down due to this inertia and momentum, which tendency must be resisted and overcome by the force exerted on the stylus; with corresponding additional effort and fatigue on the part of the signer.

Another feature of the invention relates to the reduction of the inertia and momentum by greatly reducing the size and weight of the frame by which the pens are supported and also by reducing the size and weight and number of parts of the pantograph structure. These results I am able to accomplish largely by reason of design of a machine in which all of these moving parts are located above the table upon which the documents are supported, as distinguished from previous constructions in which certain of the moving parts are necessarily located beneath the table and with their connections from the frame and pantograph over the edge of the table to a location beneath it. The reduction of length and size of the frame and pantograph also makes it possible to build the same from structural parts of smaller cross section area than are otherwise necessary so that a double reduction of the mass of the moving parts is thus made possible.

Another feature of the invention in connection with the foregoing relates to the provision of a pen supporting frame which is made from parts of angular shaped cross section as distinguished from tubes. These angular shaped parts only have approximately one-half the material and mass which is contained in the tubular members which they displace, with corresponding substantial saving in weight and inertia, but without sacrificing of stiffness.

Another feature of the invention relates to the provision of a pantograph having its joints so constructed and connected to the pen supporting frame that there is a material reduction in the number of joint members where wear and play might occur. This will materially improve the permanency and durability of the structure and reduce the possibility of the inaccuracies and lack of faithfulness in reproducing the signature movements of the stylus.

Another feature of the invention relates to the provision of a construction in which the pen members and the stylus and other attached parts are overbalanced to an extent which will ensure that the pen points naturally rise away from the surface of the paper when the stylus is released. When a signature is to be generated the stylus is pressed down in the customary manner corresponding to the act of placing and holding a pen point on the paper.

A further feature of the invention relates to the provision of an improved construction and arrangement of the stylus itself. This construction is such that a full freedom of stylus movements is permitted including complete freedom of rotation on its own axis so that the signer may at all times move his hand and fingers grasping the stylus with a range and freedom of movements fully equal to that of producing a signature in the ordinary manner.

Another feature relates to the provision of an improved construction of ball bearing mounting for the frame so that the same is permitted at all times to move both laterally and endwise with a complete freedom of movement.

Another feature of the invention relates to the provision of an improved clip construction for grasping and retaining the individual bonds or other documents with their overlapping edge portions properly distributed or fanned out so that said edge portions are properly and naturally exposed for application of the individual pen points thereto. In this connection there is also provided a table upon which the documents are supported and across which the documents may be advanced into signing position and afterwards withdrawn to a delivery position; which table is made of sufficient dimension to carry and support the bodies of the documents above or beyond the signature edges. In the use of these machines documents are sometimes presented for signature, having the signing spaces at one location or relative position on the sheets, and sometimes documents are presented in which the signing spaces are located at some other relative position on the sheets. I have therefore provided a construction of machine which is reversible in the sense that the documents can be placed in the machine from either side and can be advanced through the machine in either direction so as to adapt the machine for use under both of the above mentioned conditions of operation.

In connection with the foregoing it is a further object to provide a conveyer mechanism for advancing the documents laterally into the signing position and for afterwards carrying the documents away from the signing position to the delivery position. It is another feature and object of the invention to provide means for conveniently operating the conveyer mechanism in either direction and from either side of the machine as desired.

Another feature of the invention relates to the provision of an improved spring connection between the frame and each one of the individual pen members so that when the stylus is depressed during a signing operation each of the pen members will be individually moved into signing contact with the paper but under its own spring tension or pressure so that each pen point will individually operate under the most advantageous conditions.

Other objects and uses of the invention will appear from a detailed description of the same which consists in the features of construction and combinations of parts hereinafter described and claimed.

Figure 1:
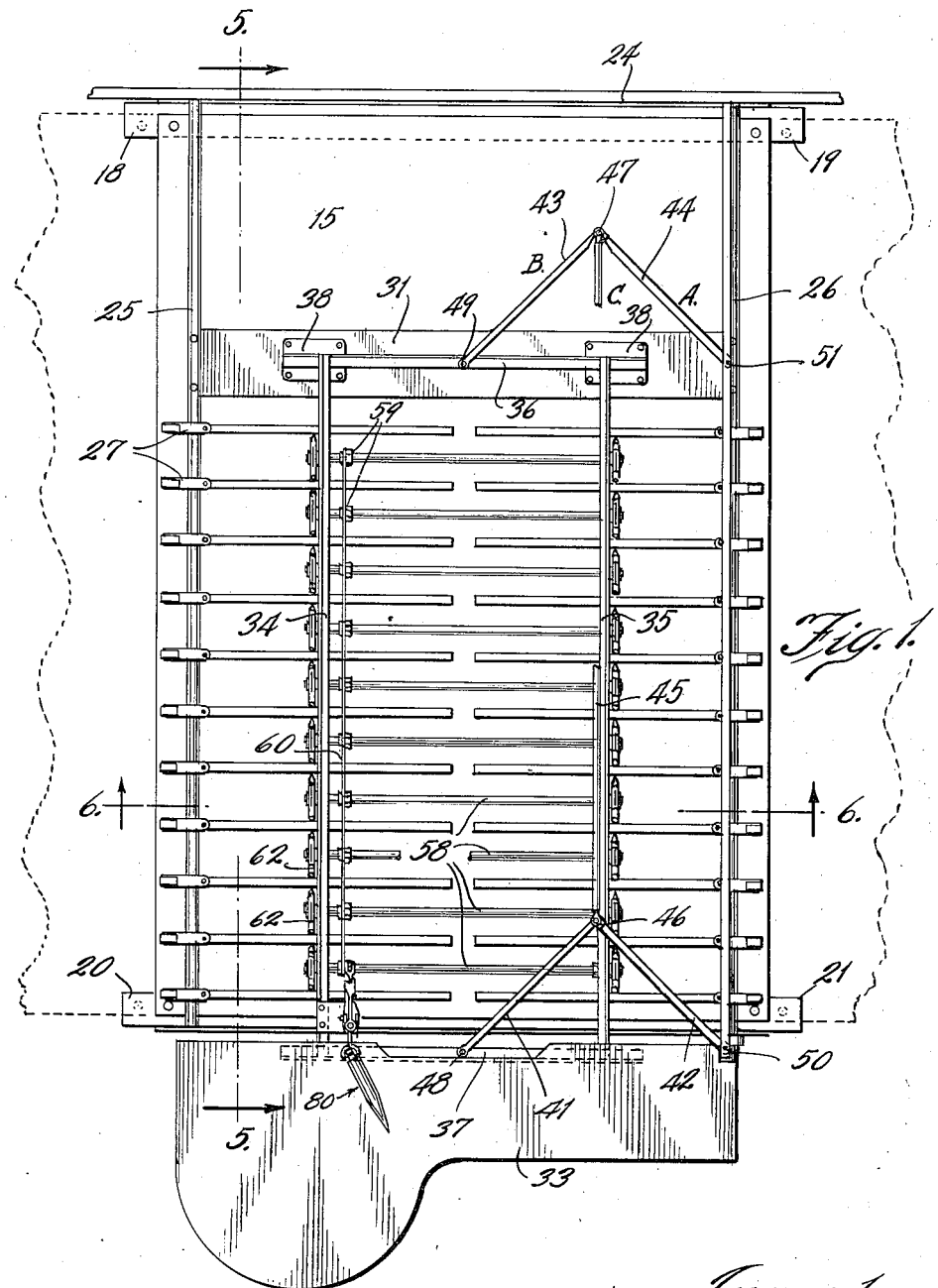
Figure 1 shows a plan view of the central or signing section of a machine embodying the features of the present invention, portions of the two adjacent sections being shown in position along side of the central panel by means of dotted lines.
Figure 2:
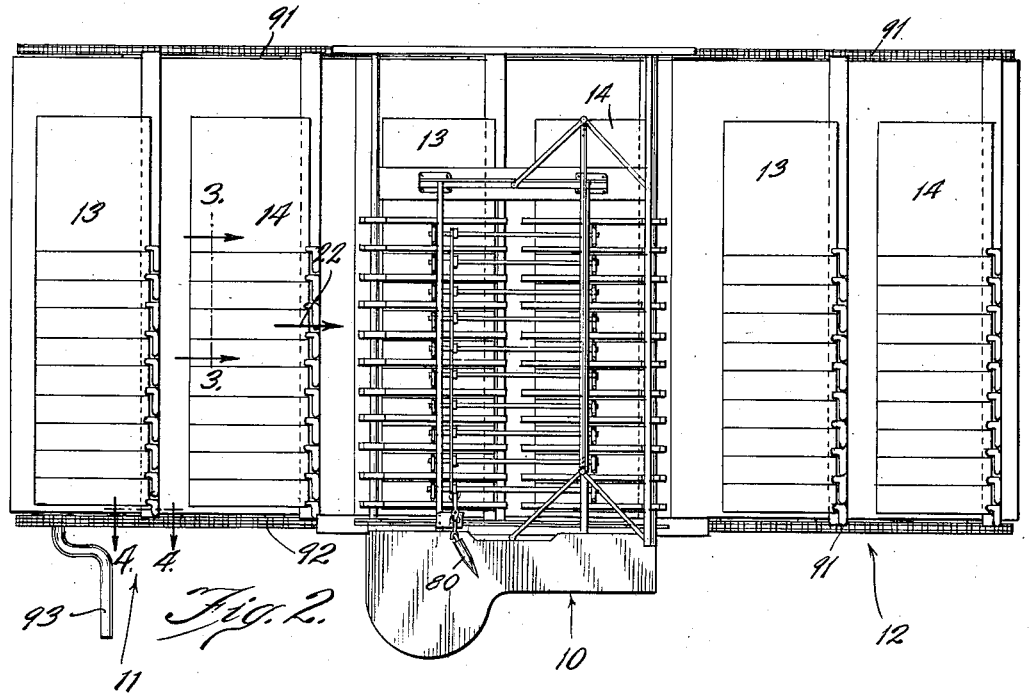
Figure 2 shows a plan view similar to Figure 1 but on smaller scale and with the two side panels shown in full lines adjacent thereto.
Figure 3:
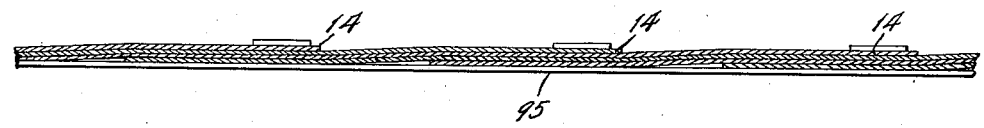
Figure 4:
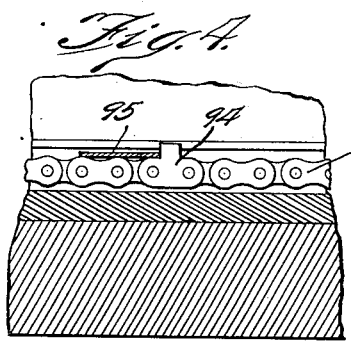

Figure 3 shows a typical fragmentary cross section through some of the over-lapping bonds or other documents together with the clips by means of which the same are individually held in place, Figure 3 being taken on the line 3—3 of Figure 2, looking in the direction of the arrows, and on enlarged scale as compared to Figure 2, the thickness of the papers or documents and the clips being greatly exaggerated;

Figure 4 shows a fragmentary section on the lines 4—4 of Figures 2 and 8, looking in the direction of the arrows, but on enlarged scale and shows the attachment of one of the flights to the adjacent carrier or conveyor chain;

Figure 5 shows a detailed section on the line 5—5 of Figure 1, looking in the direction of the arrows, but on enlarged scale, the central part of the device being cut away in order to shorten up the figure;

Figure 6 shows a cross section on the line 6—6 of Figure 1 looking in the direction of the arrows and on enlarged scale;

Figure 7 shows a detailed fragmentary view of the operating connections between the stylus and the pen carriers on enlarged scale as compared to Figures 5 and 6, a portion of the stylus being shown in longitudinal section, the principal operative parts being shown in the stylus and pen lowered position by means of full lines and in raised position by means of dotted lines;

Figure 8 shows an enlarged detailed fragmentary view of a pair of pens and pen supports, one of the brackets being broken away into section so as to reveal the connecting spring which is carried thereby, Figure 8 being on substantially the same scale size as Figure 7;

Figure 9 shows an edge view of one of the pantograph links;

Figure 10 shows a face view of one of the other pantograph links; and

Figure 11 shows a face view of the spacer bar of the pantograph.

Referring first to Figures 1 and 2 the machine herein illustrated includes for purposes of convenience three panels or sections. These are the central panel 10, the feeding panel 11, and the delivery panel 12. The bonds or other documents are placed and supported on the table of the feeding panel in over-lapping relationship as shown by the two fanned out piles 13 and 14 (see Figure 2); and upon operating the feeding mechanism these piles are advanced towards the right to the signing position on the table of the panel 10. After the signatures have been applied to the over-lapping edge portions of these documents they are then advanced a further distance to the right and onto the table of the delivery panel 12 where they are removed from the clips by which they are supported. Sometimes the operation is reversed and the feeding panel is placed at the right hand side and the delivery panel at the left hand side of the central or signing panel 10.

I will first describe the construction and operation of the signing panel 10 in detail.

This signing panel includes the stiff table 15 which is conveniently supported by a suitable frame including the longitudinally extending end angle members 16 and 17. These members are in turn carried by suitable legs or other supporting brackets not illustrated. Preferably the members 16 and 17 are extended a short distance beyond the edges of the table 15 as shown at 18, 19, 20, and 21 in Figure 1, these projecting portions being perforated to receive connecting screws by means of which the tables of the adjacent panels 11 and 12 are secured thereto. By disengaging these screws these adjacent panels 11 and 12 can be removed from the device and separately shipped or stored away; and furthermore the tables of the panels 11 and 12 are interchangeable insofar as concerns their connection to the projecting portions 18—20 and 19—21; so that by this arrangement the feeding panel 11 may if desired be located at the right hand side of the central panel 10 and the delivery panel 12 may be located at the left hand side of the central panel 10 in which case the direction of feed of the documents would be from right to left or opposite to the direction of the arrow 22 shown in Figure 2.

The frame members 16 and 17 are provided with upwardly extending brackets or supports such as 23 (see Figure 5) which are located adjacent to the corners of the central panel 10. There is a longitudinally extending frame member 24 carried by these brackets at the back side of the panel 10. There are the tubular frame members 25 and 26 which extend along above the two edge portions of the central panel 10, said tubular members 25 and 26 being rigidly connected to the brackets 23 so that they are firmly supported and cannot rotate. Brackets 27 are mounted upon these members 25 and 26, said brackets being preferably split as shown in Figure 6 so that they can be tightened up in adjusted position by means of the clamping screws 28. The brackets 27 are located at positions corresponding to the spacing of the over-lapping portions of the bonds or other documents as shown in Figure 2, the machine illustrated being intended for handling 10 of these documents in each of the piles 13 and 14 in spaced or fanned out relationship.

There is a long slender presser spring or shoe 29 for each of the brackets 27. The outer ends of these spring shoes 29 are rigidly secured to the corresponding brackets 27, the free ends of the spring shoes 29 being flared upwardly as shown at 30 (see Figure 6) so that as the documents are shifted laterally they will slide over and afterwards out from these shoes without interference therefrom. Furthermore by loosening the set screws 28 and turning the blocks 27 on the rod members 25 and 26 respectively the different spring shoes can be brought into whatever amount of adjusted spring pressure is desired, thus making it possible to individually adjust the pressures exerted to the varying thickness, which varying thicknesses are occasioned by overlapping of the documents.

Secured to the frame members 25 and 26 and preferably slightly beneath the same there is a horizontal bearing plate 31 at the back side of the panel 10. A similar bearing plate 32 is secured to the frame members 25 and 26 beneath their front end portions as clearly shown in Figure 5. This plate 32 is partly obscured by the presence of a hand rest panel 33 which is secured to the front end portions of the frame members 25 and 26 or to the adjacent bracket members 23. This hand rest 33 provides a convenient and proper support upon which the hand of the person manipulating the stylus will be naturally supported during the signing operation. As shown in Figure 1 the panel 33 is preferably flared out at its left hand side so as to provide an increased area at that point.

There is a very light and rigid pen supporting frame mounted at an elevation slightly above the cross pieces 31 and 32. This frame includes the side bars 34 and 35 and the end pieces 36 and 37. These are all rigidly connected together into a rectangular form. Also preferably this frame is made up of inverted angles having their horizontal legs at the bottom of the frame and their vertical legs constituting upwardly extending flanges all as clearly shown in Figures 5, 6, and 7.

The corners of this frame are provided with small horizontal plates 38 (two of which are hidden in the front or lower end portion of Figure 1); and there is a downwardly depending and enclosing flange 39 secured to each of these plates 38. Steel balls 40 are placed between the plates 38 and the respective supporting members 31 and 32 so that in this way the rectangular pen supporting frame is mounted on very delicate and easily operating ball bearings. The flanges 39 serve to prevent the balls from working out sidewise, and the plates 38 are of sufficient size to accommodate all ordinary writing movements of the device.

The rectangular pen supporting frame is carried in its movements by a pantograph device which permits complete freedom of movement of the frame while at the same time compelling the frame to always move with its side members 34 and 35 parallel to a given direction. This pantograph includes the end links 41 and 42 at the lower end and 43 and 44 at the upper end. This pantograph also includes a parallel spacing bar 45 which joins together the pivotal connections 46 and 47 (see Figure 1 in particular). The links 41, 42, 43, and 44 are all of the same length; the outer ends of the links 41 and 43 are pivoted to the end bars 37 and 36 at the points 48 and 49 respectively; and the outer ends of the links 42 and 44 are pivoted to the frame bar 26 at the points 50 and 51 respectively. The pivotal points 48 and 49 are both located the same distance to the left of the side bar 35 of the rectangular frame; and the distances between the pivotal points 46 and 47, between the pivotal points 48 and 49, and between the pivotal points 50 and 51, are all the same. As a result thereof the rectangular frame can be shifted back and forth and laterally with a complete freedom of movement within the limits necessary for the complete writing operations; but the side bars 34 and 35 are compelled to always maintain the same direction with respect to the machine as a whole.

The rectangular frame is preferably made of extremely light but stiff material such as duralumin or the like; and by making the frame members of this frame of angular cross section instead of tubular form there is effected a very considerable saving of weight without any sacrifice of stiffness.

It will also be noted that the entire pantograph and pen supporting frame structure is located above the table section 10 on which the writing is performed and all of these parts are shorter than the width of said writing table. As a consequence there is provided a space or area at the back side of the machine (clearly shown in Figures 1 and 2) on which the bulk or body portions of the bonds or other documents are supported, leaving the edge portions exposed beneath the rectangular pen supporting frame where said edge portions will be properly written upon. Due to this circumstance the bonds or other documents can be supported in spread out piles or other over-lapping relationship with all of the exposed edges located beneath the pen supporting frame.

In order to ensure accuracy of writing of all of the pens it is an essential to reduce any lost motion or play between the links 41, 42, 43, and 44 and the parts to which they are respectively pivoted. Furthermore all of these parts should be made very light but stiff in order to properly perform their functions. In Figures 9, 10, and 11 I have shown edge or face views of the typical link constructions which I have found it desirable to use. Thus for example the link 45 is preferably made of light tubing having the eyelets 52 and 53 inserted and riveted into its end portions. Each of the links 41 and 43 is preferably made of a light section provided with eyelets 54 and 55 on its ends; and each of the links 42 and 44 is preferably made of a light section having the jaws 56 and 57 formed at its ends. When the device is assembled the eyelets of the links 35, 41, and 43 respectively are placed between the jaws at the ends of the links 42 and 44 and the pivotal pins then connect all of the parts together for proper pivotal functioning and this construction lends itself unusually well to the provision of an arrangement which will function easily and substantially without play.

The rectangular pen supporting frame is provided with ten cross rock shafts 58 which are nicely journaled in the side bars 34 and 35. These cross rock shafts 58 lie parallel to each other and exactly at right angles to the side frame bars 34 and 35. Fingers 59 are secured to these cross rock shafts and extend upwardly therefrom and all of these fingers are pivotally connected to the lengthwise extending link 60. Consequently by shifting this link back and forth the rock shafts are all turned in unison and to the same extent.

There is a small clip or bracket 61 journaled on each outer end of each of the rock shafts 58. These clips or brackets 51 are also provided with through openings for receiving the short and light writing pen elements 62. There is a split block 63 mounted on each of the rock shafts 58 immediately adjacent to each of the brackets or clips 61; and by tightening up the set screws 64 these blocks 63 can be locked to the various rock shafts in adjusted position. There is a light coiled spring 65 for each of the pen supporting clips or brackets 61; and one end of each of said springs is connected to its pen supporting bracket and the other end is connected to the corresponding block 63.

It will be evident that in the above arrangement when the link 60 is moved to the right in Figures 7 and 8 all of the rock shafts are turned in a clockwise direction and as the tension is completely removed from each of the springs 65 the corresponding bracket or clip 61 is rocked in a clockwise direction so as to raise the pen point 66 away from the surface which it has been contacting. Conversely as the link 60 is shifted towards the left the various pen points will be brought into light spring pressure contact with the paper or other surface; and due to the provision of individual springs for all of these parts the individual pens are caused to bear under individual spring pressure at all times; and all of the pen points are permitted to individually adjust themselves to inequalities in the surface or elevation of the paper on which they are writing.

There is a small plate 67 secured to the front left hand corner of the pen supporting frame. (See Figure 7 in particular.) A light bracket 68 extends upwardly from this plate 67 and a pair of fingers or jaws 69 reach upwardly from the bracket 68 and establish a pivotal point 70 on which a light lever arm 71 is very nicely journaled. This lever arm can be freely rocked in a vertical plane intersecting the pivotal point or axis 70 at right angles, but any back and forth movement of the lever 71 towards and from the observer in Figure 7 is necessarily accompanied by a corresponding movement of the pen supporting frame. Likewise any lateral movement of the lever 71 towards either side of the drawing of Figure 7 is necessarily accomplished by a similar movement of the pen supporting frame.

A finger 72 is rigidly secured to the rock shaft 58 at the frame of the machine in Figure 1. There is a link 75 having one end pivotally connected to the lever 71 at the point 76, and to the finger 72 at the point 77.

With the above arrangement a downward movement of the right hand end of the lever 71 is accompanied by a left hand thrust of the link 60 which in turn rocks all of the shafts 58 in the proper direction to move the pen points downwardly. A reverse action necessarily takes place when the right hand end of the lever 71 is raised. There is provided a writing stylus 80 connected to the right hand end of the lever 71. The construction of this stylus is shown in detail in Figure 7. It includes a stem member 81 having one end pivotally connected to the right hand end of the lever 71 by means of a universal joint 82. This stem 81 is provided with an outwardly extending shoulder portion 83 at its lower end. A collar 84 is placed around the stem 81 and has a cross partition or shoulder 85 at its lower end which bears against the shoulder portion 83. A block or nut 86 is threaded down into the other end of the sleeve 84; and a washer or disc 87 is then secured to the end of the stem 81 at a position immediately beyond the block 86, such connection being effected by means of the screw 88. Another tubular or ring shaped nut 89 is then threaded down into the extreme end portion of the sleeve 84 and engages the washer or disc 87 at its outer face. The parts are however not tightened up sufficiently to prevent free turning of the sleeve 84 with respect to the stem 81.

Finally a cap 90 is threaded on to the end portion of the sleeve 84; and the sleeve 84 and cap 90 together are so shaped as to provide a stylus having substantially the same shape as a familiar make of pen holder. It will be seen that with the above arrangement the stylus can be readily grasped and held in a natural position by either the right or left hand of the person operating the machine, and during the writing movements there is permitted complete freedom of adjustment of the stylus either about a vertical or horizontal axis or on its own longitudinally extending axis. Furthermore the movements of the stylus are at all times accompanied by corresponding movements of the pen supporting frame.

The documents to be signed are carried along over the surface of the table 15 to the signing position where the movement is arrested during the signing operation; and they are subsequently carried on to the delivery position and a new set of these documents is moved into signing position. To accomplish these results I have provided the chain conveyor or carriers 91 and 92 which extend along the side edges of the tables and pass over suitable end sprockets. The panel 11 is in this connection provided with a crank 93 which when turned serves to advance both of the chain conveyors 91 and 92 at equal rates.

The chain conveyors themselves are provided with special links such as 94 (see Figure 4) against which are secured the cross flights 95. Each of these cross flights consists of a strip of metal extending across the tables between the two chain conveyors. There are provided two of these cross flights for each stack of bonds or documents, which bonds or documents are laid in place on these cross flights as is clearly evident especially from Figure 2. There are provided spring clips 96 at spacings corresponding to the spacings of the rock shafts 58 and the signing pens, and the clips 96 are so formed that they reach in sidewise to engage the consecutive bonds or other documents which have been spread out in the proper overlapping relationship clearly shown in the different figures. The result is that the different documents in spread out relationship are securely retained in place on the cross flights and are prevented from shifting laterally and are compelled to properly advance into signing position when the crank 93 is turned.

Due to the form of the spring leaves 29 (see Figures 6-8) and the manner in which they are mounted and carried, the bonds or other documents can be readily shifted into position beneath these spring leaves as the documents move onto the signing section 10 so that they are still more effectively held in position during the signing operation.

It will be observed that the construction of the spring leaves 29 and other adjacent parts is such that the documents can be readily transferred into signing position from either direction. That is to say the machine is so constructed that the feed can take place in either direction with equal facility and accuracy of feed. As a result, it becomes possible to interchange the two sections 11 and 12, which operation is readily performed by simply disconnecting the panels from the central section and interchanging these panels and then connecting them to the central section in interchanged relationship. This operation is also facilitated by loosening the chain conveyors from the sprockets of the driving shaft to which the crank 93 is connected; for which purpose suitable tightening devices not illustrated may be provided.

While I have herein shown and described only a single embodiment of the features of my present invention, still I do not intend to limit myself thereto except as I may do so in the claims.

I claim:

1. In a machine of the class described the combination of a table, and means for supporting and laterally transporting thereon documents with their edge portions in exposed and consecutive relationship for the purpose of receiving signatures to be inscribed thereon comprising a pair of spaced apart conveyor chains, means on which said conveyor chains are rotatably mounted, removable panels adapted to be removably carried by said conveyor chains and manually releasable yieldable members on each of said panels for yieldably holding a series of documents in substantially parallel relation on each panel.

2. In a machine of the class described the combination of a table, means for supporting and laterally transporting thereon a series of documents with their edge portions in exposed and consecutive relationship for the purpose of receiving signatures to be inscribed thereon, a rectangular frame located above said table and above said documents, a supporting plate located above the table and above the documents within a plane substantially parallel to the table, a companion plate carried by the frame and having a downwardly depending peripheral flange, and a ball located between said plates and establishing a ball support for the frame and retained in place by said flange, substantially as described.

3. In a machine of the class described, means for actuating a series of pen members for writing purposes including a stem member having a ball and socket connection at one end thereof, together with a hand grip journalled on said stem member to permit free rotation thereon while restraining said hand grip from endwise movement with respect to the stem member, substantially as described.

4. In a machine of the class described, means for actuating a series of pen members comprising a plurality of levers, stem element, and a universal joint connecting said stem element and one of said levers, and stylus hand grip comprising a lower cylindrical portion and an upper cap portion, said hand grip being rotatably mounted on said stem and manually adjustable means on said stem and threadingly engaging the interior of said stylus hand grip for securing said hand grip.

5. In a machine of the class described, means for simultaneously rotating a plurality of pen members, said means including a stem element and universal joint connecting said stem element and the actuating means aforesaid, and stylus hand grip journaled on said stem member to permit free rotation thereon and manually adjustable and selectively releasable means between said stem and said hand grip.

CHRISTOPHER D. BUDELMAN.